United States Patent
Nelson et al.

[11] 3,974,356
[45] Aug. 10, 1976

[54] MULTIPLE ARC WELDING DEVICE AND METHOD

[75] Inventors: Jerome W. Nelson; James B. Randolph, both of Houston, Tex.

[73] Assignee: CRC-Crose International, Inc., Houston, Tex.

[22] Filed: Aug. 26, 1974

[21] Appl. No.: 500,688

[52] U.S. Cl. .......................... 219/60 A; 219/125 R
[51] Int. Cl.[2] .......................................... B23K 9/02
[58] Field of Search ................ 219/60 A, 125 R, 76

[56] References Cited
UNITED STATES PATENTS

| 3,718,798 | 2/1973 | Randolph et al. ................ 219/60 A |
| 3,748,426 | 7/1973 | Stanley ............................ 219/60 A |
| 3,806,694 | 4/1974 | Nelson et al. ...................... 219/124 |

FOREIGN PATENTS OR APPLICATIONS

| 274,273 | 11/1970 | U.S.S.R. ............................ 219/125 |

Primary Examiner—J. V. Truhe
Assistant Examiner—D. A. Tone
Attorney, Agent, or Firm—Edwin M. Thomas

[57] ABSTRACT

Apparatus and method for welding girth joints in pipelines and similar structures, of the general type described and claimed in U.S. Pat. No. 3,806,694, is improved by adding to the normal or conventional head, on its frame, a second or supplemental welding head with its own independent wire electrode, electric power and shielding gas supply. The second head is mounted on an adjustable support for accommodating work pieces of different radius or for varying arc positions. Oscillating means for spreading the molten metal across the width of the joint, as normally provided for the single welding head in the patent mentioned, are adapted to operate the second head as well and to vary its amplitude of movement. Separate means are provided for adjusting the spacing between each head and the work and also for lateral adjustment to align the heads with the plane of the joint. By these means, the number of stations required for a multiple pass operation, on thick wall pipe, for example, may be reduced. By operating two welding heads on each of two or more carriages, welding equipment requirements may be cut nearly in half, with beneficial effects on the weld, due to improved thermal effects. Either head may precede the other; cantilever means provide stability for the head mounted most remotely from the frame.

13 Claims, 5 Drawing Figures

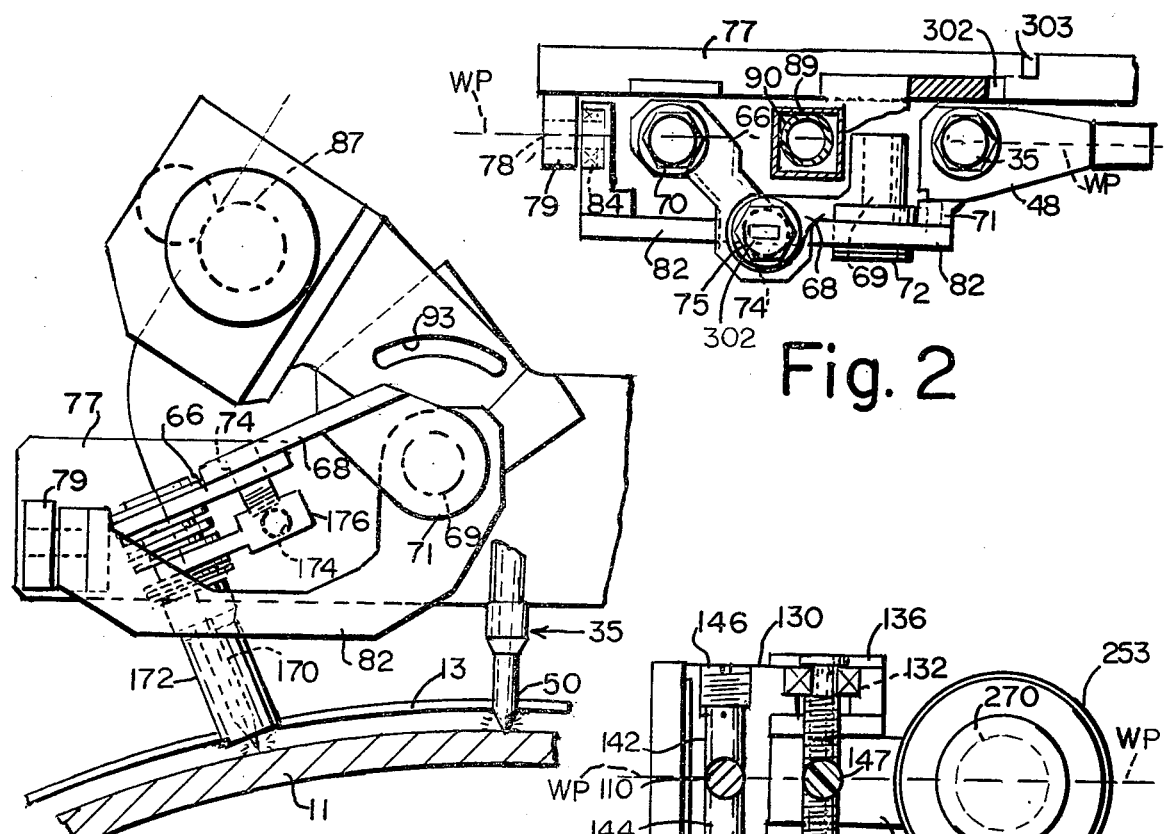
Fig. 2
Fig. 3
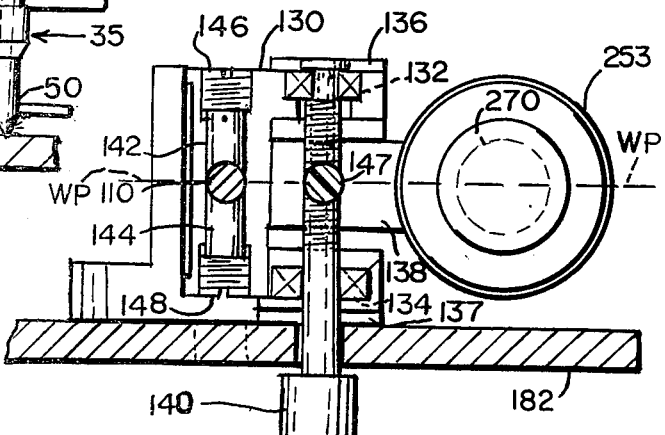
Fig. 5
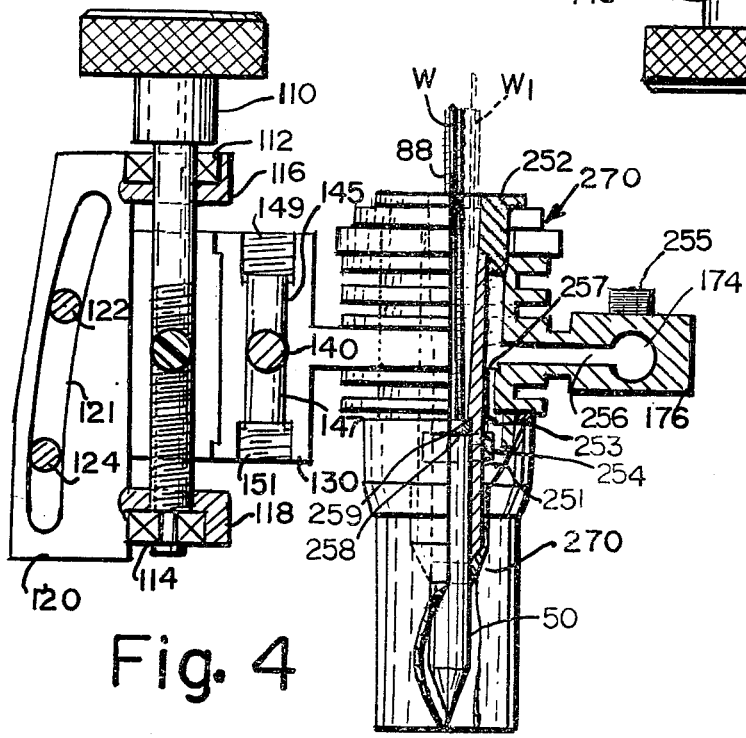
Fig. 4

MULTIPLE ARC WELDING DEVICE AND METHOD

BACKGROUND AND PRIOR ART

In recent years efficient automatic systems have been developed for welding girth joints in pipelines. One successful system involves a combination of operations, starting with an inside pass or "stringer bead" operation, where the pipe ends are held in mutual alignment by an internal clamp while an internal orbiting welder travels around inside the joint, as described and claimed in U.S. Pat. No. 3,564,264 and others. For most joints, several sequential welding steps or passes are required. This internal bead then serves not only to hold the pipe pieces together while unclamping and other operations are performed but serves also as a backing for the later passes, performed from the outside, to build the weld from the inside out. Means and methods for completing the operations from the outside are described in such patents as U.S. Pat. Nos. 3,718,798; 3,806,694 and others. A self-propelled carriage, guided in an orbital path around the joint, transports the welder which sets up and maintains an electric arc and operates to lay down molten metal and to fuse it into previous passes, in sequence, until the gap between the pipe ends is filled and capped. Normally, each pass is performed at a separate station, sequentially along the pipeline.

In cases where the pipes to be joined are of thin wall construction, say, below about 0.250 inches, the weld may be completed in only one or two outside passes, added to the internal stringer bead. In many cases the pipe wall is thicker than this and additional passes are required since there is a practical limit to the amount of molten weld metal that can be added and the amount of heat that can be put into the weld by the electric arc at a single pass, while still obtaining a weld of good quality. In any case, it is desirable to complete the welded joint in as few separate operations and stations as possible. As successive passes or steps are usually performed at separate and consecutive stations along the pipeline, each station must have a complete welder unit, i.e., at least a guide track, a carriage, and a welder device transported by the carriage. One or more operators are required at each station; hence, economy of manpower as well as of equipment dictates that the number of stations be held to a minimum, consistent with obtaining high quality in the weld at every step. Because of the hazards of leaks or breaks in the line, and the waste of valuable products which might occur if welds should fail, strict standards are required in pipeline construction. The industry, therefore, is interested in welding processes which will produce high joint quality. The costs of manual operations are very high; hence, there is a demand for a simple, automatic welding means and method that can complete work of high quality with a minimum of costly equipment, manpower and work stations.

On land, where space may not be a problem, it may be less important to reduce the number of stations that are needed to complete welding operations, although economy of operation is always important. At sea, or in any offshore situation where the pipeline is built on a barge and is lowered step by step to the ocean floor or other underwater surface as it is completed, the number of stations permissible becomes highly critical. To insure against possible pipeline breaks with consequent damage to the environment, and in view of the high costs of repair of underwater lines, as well as the value of oil, gas, and other products to be transported, the pipe used often has comparatively very thick walls. In many cases five, six or even more separate welding passes may be made to complete a weld in such pipe. By prior art methods, as many stations as passes are required, spaced consecutively along the line by a length of "joint" of pipe, commonly 40 feet per joint. With such work, using six stations, a line over 200 feet long is necessary, and longer if further stations are required. Aside from the welding, stations are usually required for stacking the pipe, bringing it to the line, etc., and, after the welding, for coating the welded joint, encasing it in concrete, etc., as is well known in the art. Space on any barge is limited and it is obviously desirable to complete the welding and all other operations in as few stations as possible. Even on land, where space is not so critical, it is desirable to keep the operation as compact as is convenient, for better communication, utilization of manpower, etc. An object of the present invention is to increase the portion of a welded joint that can be made at a single station. This saves equipment requirements as well as space.

Quite independent of the considerations mentioned above, there are desired physical and/or metallurgical effects on the weld that can be achieved by a dual weld technique. When welding passes are spaced apart by long time intervals, heat input must be higher to compensate for greater cooling, which can adversely affect the physical properties of the weld. Depending on the energy input of the arc and the heat absorbing and conducting properties of the metal, the cooling rates for the joint may be excessive. Among other things, high cooling rates may cause undesirable brittleness or high hardness and stresses in the welded joint. By making at least some in a series of plural passes close together, time-wise, some of these effects are avoided. In some cases, as in the prior art where single and separate welding passes are used, a special heat treatment may be required after the welded joint is completed, to normalize and/or to relieve stresses. Better heating and cooling rates may be obtained by multiple weld passes in close succession to eliminate the heat treating step and the extra station it requires. If six passes, for example, can be performed at three or four stations, while also eliminating the extra heat treating station, three or more stations can be dispensed with, greatly facilitating the operation, and reducing costs, especially on offshore barge operations.

Hence, another object is to better control heat input and cooling rates by combining or doubling up weld passes on a single apparatus. Preferably, multiple weld passes are performed at most stations, reducing station equipmment, and personnel requirements by as much as one-half. In theory, perhaps, more than two passes may be made with each piece of apparatus, but to obtain the desired metallurgical results, two passes are satisfactory. Experience has shown it to be very difficult for an operator to control more than two simultaneous passes or to restart more than two passes in case of a malfunction, unless conditions are unusually favorable.

It is known, of course, to use multiple arcs in tandem for welding, particularly in straightline operations. Such have been used in welding together the straight adjoining edges of metal plates. To apply this principle to pipeline girth joint welding, however is not so simple for several reasons. In the first place, pipes vary widely in diameter, that is the curvature that must be followed by the device may be greatly different from one job to another. This introduces one set of complications. The apparatus must travel in orbit, another limitation. Also, for deep gaps, as are to be welded in thick wall pipes, the width of fill needed may vary considerably, from bottom to top. There may be need, for this reason, to oscillate or move from side to side the welding head which is filling a wider part of the gap than its predecessor, whereas another head filling a narrower part of the gap should be oscillated at a narrower amplitude or perhaps not at all. To devise a simple apparatus that will accomplish such operations, without undue complications, is another object of this invention.

The success achieved in the past by the welding apparatus described in U.S. patents mentioned above, and others related thereto, has been based to a considerable extent on the fact that the devices are simple, rugged, but still highly precise and rapid in their operations. The devices are capable of fine adjustment so as to follow in the plane of the joint with high accuracy, and to stand off the optimum distance from the work, to oscillate or reciprocate with fine control from side to side of the joint in a path that will give optimum fill with effective side bonding of the joint, etc. To add another head to such an apparatus, thereby essentially doubling its capacity, without loss of high precision, is another and important object of the present invention. In thick wall pipe, it is often desirable to use a tapered gap or kerf, i.e., one that is wider at the top or outside, and an object here is to fill each layer of molten metal completely across the gap. Consecutive layers thus become progressively wider and an aspect of the present invention is the concept of increasing the oscillation amplitude as the consecutive passes are made, without using a separate oscillator.

BRIEF DESCRIPTION OF DRAWINGS

FIG. 2 is a fragmentary sectional view, taken substantially along the line 2—2 of FIG. 1, certain parts being omitted or broken away.

FIG. 3 is a fragmentary side view of a modification, showing somewhat different welding means and supporting elements therefor.

FIG. 4 is a fragmentary side view, with parts omitted or broken away, of still another modification, involving alternative welding apparatus and supporting means.

FIG. 5 is a top view, with parts in section or parts omitted, of the apparatus of FIG. 4.

DESCRIPTION OF PREFERRED EMBODIMENT

Figure 1:
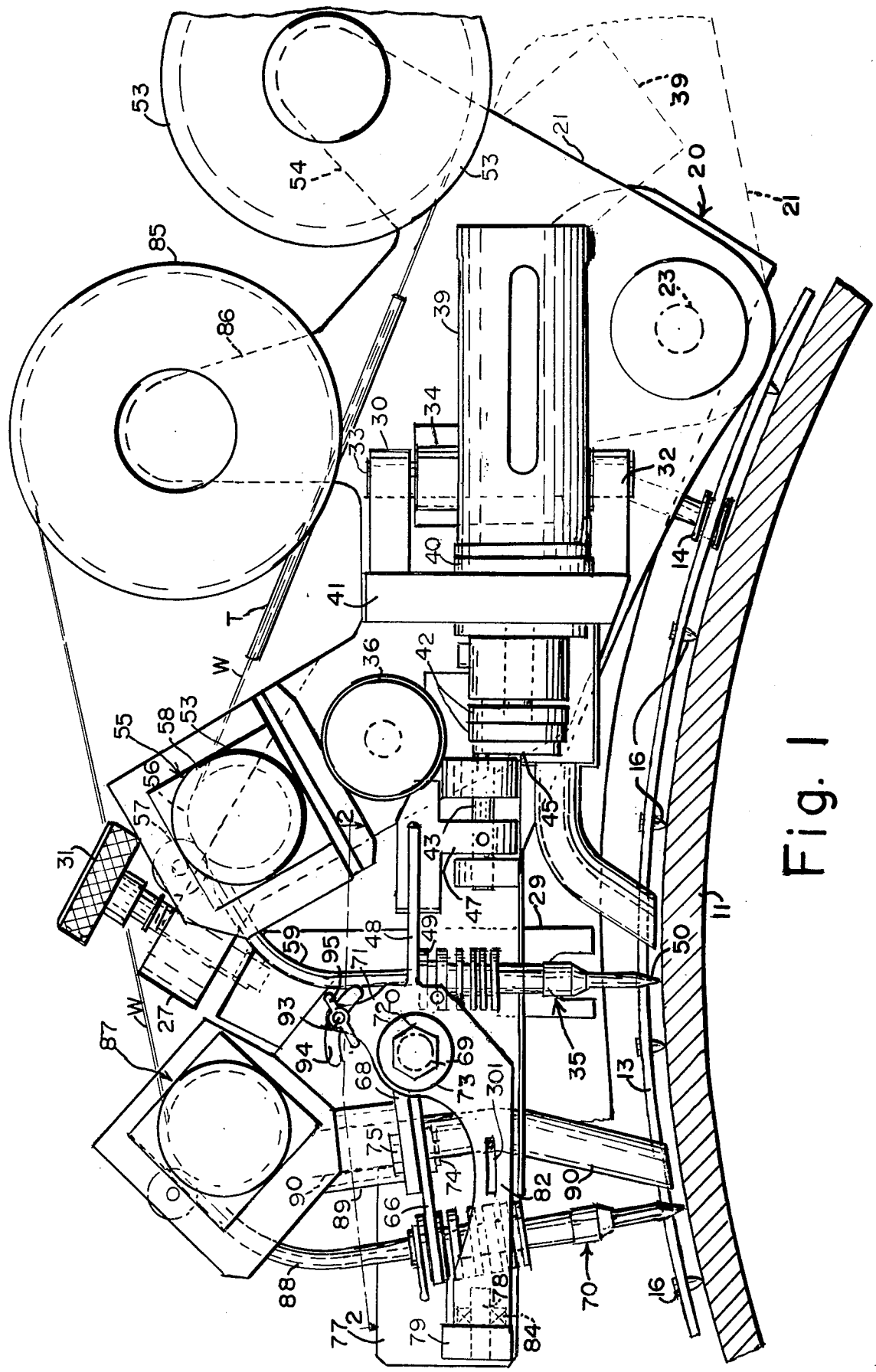
FIG. 1 is a side view of a preferred welding device, according to the present invention, including a general showing of supporting carriage and guide track means which are not a part thereof but whose description seems desirable to properly explain the invention.

Referring first to FIGS. 1 and 2, there are shown in side view and in top or partly sectional view an improved welding apparatus having the usual conventional welding head 35 and a supplemental head 70. These terms are used for convenience, it being understood that in most cases neither head is more important than the other and that either of them may be modified in form, size, or purpose without departing from the spirit and purpose of the invention. The device can be run in either direction when the oscillation widths of the two weld passes are equal; normally, it is unidirectional in operation with the leading pass having the narrower oscillation.

In general, the apparatus shown in FIG. 1 includes a work piece or length of pipe 11 which is to be welded to another and similar piece not shown. A guide band or track 13 surrounds the pipe 11, being firmly locked in place parallel to the weld place by appropriate tightening or clamping means, not shown herein, but described and claimed in the Miller and Nelson U.S. Pat. No. 3,604,612 and shown in U.S. Pat. No. 3,806,694 to Nelson, Pollock and Randolph. Much of the mechanism illustrated in FIG. 1 is shown in the latter patent, which may be referred to for other details not of particular importance to the present invention. In either case, the supporting carriage 20 preferably is of self-propelled type, having its own drive motor and being guided in its orbital path around the pipe by grooved wheels such as is shown at 14. One or more of such wheels may be power driven, whereas the others may be merely guide rollers or idling retainers to keep the carriage on the track 13. The track 13 is spaced from the work surface 11 by foot elements or spacers 16. The particular carriage described in U.S. Pat. No. 3,604,612 is of rigid construction and is adapted to fit only pipes of similar diameters, or nearly similar. Where pipes of widely varying diameters are to be welded, it may be preferred to employ a carriage of the adjustable or so-called "flexible" type, as described in an application by Nelson, Randolph and Miller, Ser. No. 374,050, filed June 27, 1973, now U.S. Pat. No. 3,844,468. The latter has the advantage of versatility, being readily adaptable to many different diameters of pipe. As noted above, however, the carriage 20 itself is not part of the present invention, although a precision driven and precision guided carriage of some suitable kind is essential to satisfactory operation of the welding equipment of the present invention.

The welding apparatus of this invention comprises a main frame or side plate member 21 which is firm and rigid, attached pivotally to the carriage 20 at its lower right end, as seen in FIG. 1. A bolt or pin 23, or equivalent pivot device holds the carriage against any lateral motion or any movement other than pivotal, the purpose for the pivotal movement being to permit lifting the welder per se to a raised position, indicated partly in dotted lines, for inspection, replacement or repair of expendable parts around the arc, or for cleaning, etc. Normally, the carriage is locked down in welding position by a quick-release locking means not shown herein but described more particularly in U.S. Pat. No. 3,806,694, mentioned above. The lock-down means comprises a forked member 29, firmly secured to the carriage 20 by means not shown, and an upper arm 27 integral with side frame 21, extending to the left, FIG. 1, which can be quickly and precisely attached to fork member 29 by quick release and fine positioning means more fully described in the patent just mentioned. On being released, the welder may be swung clockwise, about pivot 23. When the locking parts are secured together, the whole welding device mounted on frame 21 is rigid and unitary with the carriage 20 and travels with it in fine alignment with the weld or the plane of the joint to be welded. A micrometer screw 31 is provided for accurate adjustment of the welder tip or nozzle 50 of head 35, the latter being set to guide consumable electrode wire W into the arc, in a manner now well known in the art. Reference character 35 refers to the first welding head as a whole, while reference character 50 refers to the tip or contact tube where the arc is formed. The latter is an expendable item, often being burned by the arc. Part 50 is quickly and easily replaceable when the carriage is raised, as described above and in U.S. Pat. No. 3,806,694. Screw 31 thus sets with high accuracy the so-called CTWD (contact tube to work distance) or spacing between tip 50 and pipe 11, which is one of the critical parameters for successful welding.

As further described in the same patent, the welding device includes a special means for oscillating the welding head, and particularly the contact tube 50, from side to side, with respect to the weld plane, as it is transported around the joint. The amplitude of this oscillation may vary from zero to a maximum, depending on the width of the gap to be filled, or the width of a capping pass to be made to cover the gap, as the weld is completed. The oscillation means, and the welder head itself, are mounted in a subframe 41 pivoted through ears 30 and 32 on a shaft 33 which is mounted in a bearing bracket 34 on the main frame or side plate 21. This subframe 41 is otherwise free to swing (but without play) about pin 33 in a more or less horizontal plane as viewed in FIG. 1, but is normally held in a predetermined position with respect to plate 21 by a micrometer screw 36. The purpose of this microadjustment means is to bring the welder contact tube 50 into precise alignment with the plane WP of the weld (see FIG. 2). If the head 35 is being oscillated from side to side, it is of course the center line of such oscillation that is brought into this alignment. When the apparatus is properly set, travel is started, an arc is struck, and molten electrode material is fed into and fused to the bottom and side walls of the gap to be filled, as is well known.

The reciprocating or oscillating means for moving the head 35 back and forth across the gap in the joint to be filled comprises an electric motor 39, mounted on a base 40 fixed to subframe member 41, having gear reduction means not shown herein, but described in the patent last mentioned above. Through these means, the motor derives an eccentric means 42 which has a variable throw, as already suggested, and which operates a rocker shaft 43 through a rocker arm 45. An improved form of this oscillating mechanism is described in an application by Nelson, Randolph and Pollock, Ser. No. 421,339, filed Dec. 3, 1973, and this preferably may be used here. Its details are not of importance in this invention.

Rocker shaft 43 bears near its left or forward end (as seen in FIG. 1) a rocker arm 47 which supports a rigid cantilever bar 48. The base 49 of the welding head 35 is secured to the bar 48 and means for bringing electric current for the arc and inert gas for shielding the arc are secured here also, as is conventional in the art. Water cooling means may be included, to hold equipment temperatures down around the arc, as is conventional and if desired. With this arrangement, as the rocker shaft 43 is rocked to a predetermined amplitude of movement, depending on the setting of variable throw eccentric 42; hence, the head will be oscillated and the tip or contact tube 50 will describe a more or less sinuous path centered along the weld plane, whose width depends on the setting of the variable eccentric. In FIG. 1, it may be considered that the arc will swing through the plane of the paper, towards and from the observer as the head is oscillated. In the present invention, oscillation of the head includes amplitudes between zero and a practical maximum.

A consumable electrode wire W is supplied from a spool or reel 53 mounted on a bracket 54 at the right end of the welder side frame 21. Wire feeding means, shown generally at 55, are similar to those described in some of the above mentioned patents, also in U.S. Pat. No. 3,632,959 to Nelson and Randolph. The feed means comprise feed rollers 56 and 57 and a wire guide tube 59 which is flexible but arranged to resist any tendency to impart a cast to the wire as it advanced through the contact tip 50 to the arc. Tube 59 preserves a fixed relationship between the feed roller and the head 35 which is not disturbed when the position or spacing of the nozzle 50 with respect to work piece 11 is adjusted by screw 31. The rollers 56 and 57, or one of them, are driven at a precisely controllable speed by a variable speed electric motor 58 through appropriate gearing as more fully described in several of the patents mentioned above, especially U.S. Pat. No. 3,632,959. Tube T insulates the wire coming from rear spool 53 where it passes by wire on spool 85.

As explained above, it is highly desirable, in many cases, to be able to make plural welding passes with a single carriage at a single station. The present invention includes means for making two or twin passes simultaneously in closely timed sequence. For convenience, the head 35 will be referred to as the conventional or normal or leading head, being essentially of the same form and arrangement as in the patents mentioned above, particularly U.S. Pat. No. 3,806,694. The other head 70 will be referred to as a second, secondary or follower head. It is to be understood, however, that this is not to imply that one head is superior to the other, as they will generally be of equal importance and utility.

The second or follower head 70, then, is supported on an outer arm 66 which is supported in turn on another or inner arm 68, FIG. 2. The latter is mounted for pivotal adjustment or movement up or down on a bolt 69 secured to an arm 71 fixed, in turn, to the plate 48, which carries and oscillates the conventional or leading head 35, as already explained. A nut 72 and a washer 73 on pivot bolt 69 may be loosened to permit the articulated arms 66, 68 to swing up or down with respect to the work surface 11. (It will be appreciated that the carriage may at times be below the pipe 11 and adjustment towards the pipe would be up and not down but these terms are used for convenience only.) This adjustment is needed for two reasons, viz., to accommodate pipes or other work pieces of different diameters: it is used also to adjust the CTWD of head 70 with respect to the work. Arm 66 is pivotally secured to arm 68 through a bolt 74 having a nut 75, which may be loosened to permit swinging arm 66 in a more or less horizontal plane, when in the position of FIG. 1, with respect to arm 68, e.g., for aligning the welder nozzle or contact tube with the plane WP of the weld. After adjustments in either case, nuts 72 or 75 may be retightened to hold the parts firmly in their adjusted positions.

As the welding nozzle 70 is cantilever supported at some distance from its main support bar 48, it is desirable to provide additional and stabilizing support for its outer end. For this purpose, a rigid bar 77, fixed to subframe 41, extends forward to the left, FIGS. 1 and 2. Also, the arm 71, which is rigidly affixed to bar 48, bears another curved arm 82 which also extends forwardly or to the left, FIGS. 1 and 2, in cantilever fashion for cooperation with bar 77. Like all the other parts mounted on subframe 41, the bar 77 and all its supports may be moved towards and away from the main frame or side plate 21 by turning screw 36, but its position in this respect is fixed accurately when this screw is set. Friction braking means are provided to hold both the screws 31 and 36 in their set positions, as will be mentioned below in connection with FIGS. 4 and 5, and as explained in U.S. Pat. No. 3,806,694 and in a more recent patent application, Ser. No. 456,626, filed Apr. 1, 1974, by Nelson, Randolph and Pollock. It will be noted that adjustment knobs 31 and 36 move both heads 70 and 35 in unison. These knobs may be used by the operator during the welding cycle.

At its front end, cantilever bar or arm 77 provides support for the front end of arm 82 through a pin 78, mounted in a bracket 79 on 77 and in line with the axis of the rocker shaft 43. A play-free antifriction bearing 84 mounted on arm 82 closely engages this pin and thus supports arm 82 and rigidifies the whole assembly, including both welding heads 35 and 70 and the entire oscillating mechanism. The alignment of the bearing 84 with shaft 43 provides for a smooth operating oscillation movement to both heads. However, since the radius of the nozzle or tip of head 70 may frequently be at a greater distance from the axis of oscillation (axis of rock shaft 43) it may be swung through a greater amplitude of motion than head 35, for a given angular movement of shaft 43. This arrangement will often be desirable, for example, when head 50 is leading and making a last filling pass and head 70 a capping pass, both heads moving clockwise, FIG. 1. An adjustable slide 301 on member 82 is provided to allow changes in the distance between the welding arcs at the two heads 35 and 70. Also, the rear plate 77 is slidably mounted at 303, FIG. 2, a slot 303 being provided to accommodate this adjustment. It will be understood that the carriage may run in either direction, at least in some cases, so that either head may lead, depending on the type of pass to be made. Referring to the left end of the unit as the "front", as above, is for convenience only. Head 70 may be disconnected from oscillating arm 48 or its extension and fixed to rear plate 77 to provide for a non-oscillating pass while head 35 is being oscillated.

For supplying consumable wire electrode material to the added head 70, a reel 85 is mounted on a bracket 86 and feeding means 87, essentially like means 55, drive the wire from reel 85 through a flexible guide tube 88 and through the nozzle of head 70 to the arc where welding is accomplished. The feeding means 87 is supported on a hollow rectangular column 89 fixed to the cantilever support bar 77 previously mentioned. A nozzle or tube 90 for supplying inert gas around the welder tip 70 is passed through this hollow column 89, being connected at its upper end to conventional gas supply conduit means, not shown. As noted below, the gas supply may surround head 70, if desired.

With the arrangment described, the two heads 35 and 70 travel together synchronously or in unison, one making a pass and the other adding to it as it comes along closely behind. The spacing between heads and the travel rate are adjusted for optimum heat control. If desired, the two heads 35 and 70 may each be vertically adjustable in its own mounting, so that the amplitude of oscillation imparted to each by a given angular oscillation of arm 47 may be adjusted as desired, within limits. That is, by turning screw 31 to bring the axis of rocker shaft 43 closer to or farther from the work, the effective amplitude of oscillation for either head may be set as desired; the other head then may be raised or lowered appropriately along its own axis and its amplitude of oscillation will depend on three factors (1) the throw of eccentric 42, (2) the setting of screw 31, and (3) the distance of the tip from axis 43.

A bolt 93 passing through an arcuate slot 94 in plate 77, centered on bolt 69, may be locked in place by a wing nut 95. This allows the wire feed 87 to move with the head 70 about the common pivot, bolt 69, and therefore maintains the same length of tube 88 between the wire feed means 87 and nozzle 70.

Referring now to FIG. 3, the apparatus arrangement there shown is quite similar to that of FIG. 1, except that the welding head 170, otherwise similar to head 70, is surrounded by the shroud of refractory material 172 so that the inert gas blanket may be held directly around the arc. Gas is supplied to a connection 174 and flows through a hollow arm 176 into a passage that connects with shroud 172. In some cases this arrangement is preferred; in others the arrangement of FIG. 1 is better, as where the directed force of the inert gas stream as it emerges from the nozzle or tube 90 is helpful to hold the pool of molten metal at the arc against running out of the joint. In other respects, FIG. 3 is similar to FIG. 1 and the identical parts are given the same reference numbers, which have been referred to above.

FIGS. 4 and 5 show another arrangement wherein the hinged joint at bolt 69, FIG. 1, is replaced by a separate vertical adjusting mechanism for the leading or outboard head 270. In some cases, the arrangement of FIG. 1 is difficult to set with high precision. Or difficulty may be encountered in locking the head in a precise position, requiring repeated trials or adjusting several times. In the arrangement of FIG. 4, a micrometer screw 110 is mounted in upper and lower precision bearings 112 and 114 secured to the flanged projections 116 and 118, respectively, of a bracket 120. The latter bears an arcuate slot 121 which rides on a pair of bolts 122 and 124 secured in a member 182 which is functionally equivalent to cantilever bar 82 which is shown to be fixed to the subframe 41 of FIG. 1. With this arrangement, bracket 120 may be raised or lowered with respect to the bolts 122 and 124 by loosening nuts (not shown) on these bolts, retightening them after an approximate adjustment has been made. The arcuate slot 121 approximates an arc centered on bolt 69, FIG. 3. Then the micrometer screw 110, which passes through a slight clearance hole in a bracket 130 that supports the welding head 270 may be turned to obtain a precise vertical adjustment.

Mention was made above of braking or friction means used to prevent the micrometer screws such as 31, 36, etc., from getting out of adjustment due to vibration and analogous causes. Such means are described in the above mentioned U.S. Pat. No. 3,806,694 and in application Ser. No. 456,626, above. They are shown here, diagrammatically only. For the vertical adjusting screw 110, FIGS. 4 and 5, they comprise a pair of opposed friction pads 142 and 144, of elastic material, FIG. 5, such as rubber or other plastic composition which is fairly hard and elastic, confined in a tubular zone and placed under compression by screws 146 and 148. These pads preferably are forced or molded into shape against the threaded parts of the screw 110, to provide a pronounced braking effect on this screw. The magnitude of braking effect can be adjusted by tightening or loosening the set screws 146 and 148.

For lateral adjustment, a transverse micrometer screw 140 is mounted in the bracket 130, being fixed in antifriction bearings 132 and 134 set in arms 136, 137 of bracket 130, and threaded through a clearance hole in an arm 138 by which the head 170 is supported. As best seen in FIG. 5, with this arrangement, the head 170 may be moved up or down forward or backward to align it with the weld plane WP. The bar 182, shown in FIG. 5 but not in FIG. 4, provides a cover for the arc.

Similarly, the transverse adjusting screw 140 is braked or held in a set position by a pair of pads 145 and 147, with adjustable set screws 149 and 151 behind them applying as much pressure as is desired to produce the needed braking effect.

To allow shielding gas to flow concentrically around the welding tip or nozzle, while electrode wire W is fed to the tube 50 through a spirally wound wire guide tube 88, which leads from the wire feeding means 87 to the contact tube 50, the following compact nozzle design is used.

The welding head as a whole is indicated at 270. Within it is fitted an externally threaded electrode retainer 251 in the form of a tube having a tapered bore, larger at the top than further down, to permit the electrode wire and its guide conduit 88 to swing from side to side, relatively speaking, as the head is oscillated. The relative position indicated at the right is designated $W_1$, it being understood that the head rather than the wire W is oscillated from side to side. A holder 252, also tapered internally, sits on top of the retainer 251 and holds it in place, being threaded into the head 270. Also, a nut 254 which rests against an internal collar 253 within head 270, screws onto the lower end of retainer 251, locking it against the element 253.

A junction block 176, cast or otherwise formed as a part of head 270, has a threaded electrical connection 255 to which a power cable, not shown, may be attached to supply electrical current to the welding arc. A gas connection 174 in member 176 is adapted to receive gas from a conduit, not shown, and conducts this gas around the retainer 251, where it flows downwardly through a series of small orifices 257, arranged in a circle in collar element 253 to flow around the nozzle 50 and thus to shield the arc against atmospheric oxygen, nitrogen, etc. A nut 258 is threaded on the lower end of the spiral wire guide tube 88, to hold it in place, resting against an internal shoulder 259 within the guide tube retainer 251.

The arrangement of FIGS. 4 and 5 provides a somewhat more precise adjustment for spacing and aligning the head with respect to the joint or the weld plane than the arrangements of FIGS. 1 and 3. It will be obvious, however, that these mechanisms are essentially interchangeable and, for many purposes, are equivalent. Many other arrangements may be made and other modifications and alterations which do not depart from the spirit and purpose of the invention will suggest themselves to those skilled in the art.

In its method or process aspects, the invention includes a combination of steps which is believed to be novel. A plurality of welding instrumentalities are moved around the work in an orbital path and in unison, being arranged to accommodate various curvatures in said orbital path. These instrumentalities, which can be of various forms, are oscillated from side to side by a common means, preferably in such a manner that they may, if required, be oscillated to different amplitudes, to fill different widths of gap of space with molten metal. More specifically, the instruments are arranged so that each has its own gas supply and each head or instrument can be moved transversely for adjustment, or for oscillation, to the extent required, without interference with the other. The oscillation amplitude of one head can be set at zero or it may be up to maximum amplitudes. By adjusting the distance of each contact tube from the axis of oscillation, the plural heads thus may be used to fill a tapered gap smoothly and uniformly.

It is intended by the Claims below to cover all these apparatus arrangements and their obvious equivalents and variations as broadly as the state of the prior art properly permits

What is claimed is:
1. An apparatus for forming an arc welded girth joint in sequential welding passes in a weld plane between the adjacent ends of annular work pieces of similar diameters, such as lengths of pipe in pipelines and the like, wherein consumable electrode material is fused by the arc and deposited in a gap or kerf between said adjacent ends in the presence of a protective shielding means, the improvement which comprises the following, in combination:
 a. A main welder frame and means for guiding said main frame in orbital travel around the work pieces at said weld plane,
 b. A pivoted subframe secured to said main frame and adjustable with respect to said main frame for pivotal movement transversely of said weld plane,
 c. A leading welding head mounted on said pivoted subframe and a follower welding head carried by a cantilever secured to said leading head, said cantilever being angularly adjustable with respect to said leading head for positioning the follower head adjustably with respect to the work surface of said work pieces,
 d. Means on the subframe for adjusting each of said welding heads about a pivot point to maintain a fixed head angle with respect to the work surface, regardless of diameter of said work pieces, and
 e. Separate and independent means on the subframe for supplying electric current and consumable electrode material to the individual welding heads.

2. Apparatus according to claim 1 in which means are provided for oscillating at least one of said heads laterally with respect to the weld plane.

3. Apparatus according to claim 2 in which a single means is provided to oscillate both said heads in unison.

4. Apparatus according to claim 1 in which a single means mounted on the frame is connected to both heads to oscillate them in unison and including means for varing independently the width or amplitude of oscillation for each head.

5. Apparatus according to claim 1 which includes electrode wire drive means for the leading head and means for adjusting the position of said wire drive means so as to maintain a fixed length and curvature of wire, between said drive means and said leading welding heads.

6. Apparatus according to claim 1 in which a supplemental cantilever member extends from the frame to support the outer end of the more remote head member, thereby to stabilize it in travel.

7. Apparatus according to claim 1 in which an oscillating means is provided to operate both said heads by swinging them about an axis of oscillation as they travel in orbit around the joint being welded and wherein cantilever means extending from the frame support the heads at a point beyond the farther head from the frame and in line with said axis of oscillation.

8. Apparatus according to claim 7 which includes separate means for adjusting each head to accommodate work pieces of different diameters.

9. Apparatus according to claim 1 which includes means for varying the distance between the leading head and the follower head.

10. Apparatus according to claim 1 which includes a single means for adjusting both heads laterally with respect to the weld plane.

11. Apparatus according to claim 1 which includes a single means for adjusting both heads in the weld plane to selectively set their distances from a work piece surface.

12. Apparatus according to claim 1 which includes means for oscillating one of said heads laterally and means for fixing the other of said heads against lateral oscillation.

13. Apparatus according to claim 1 which comprises a compact welding head, flexible means for guiding a consumable wire electrode into said head, the head being formed to permit relative oscillation of said head with respect to the guiding means, and means for directing an annular gas stream through said head to shield the welding arc.

* * * * *